Feb. 27, 1951     F. M. VARNEY     2,543,078
EXPANDABLE PULLER
Filed May 31, 1946     2 Sheets-Sheet 2
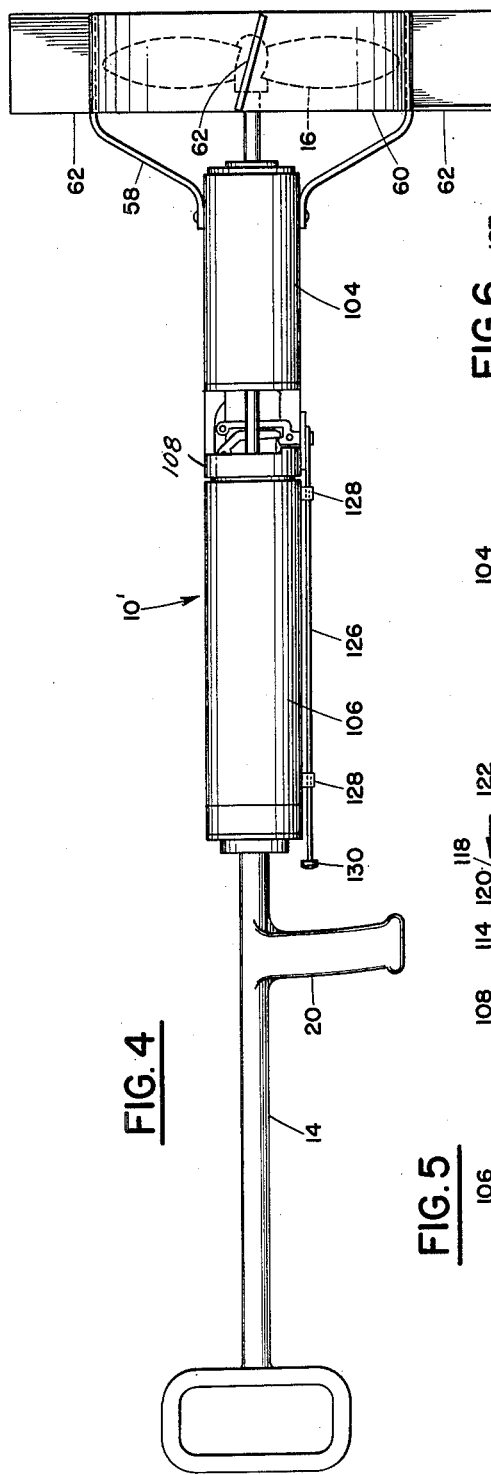
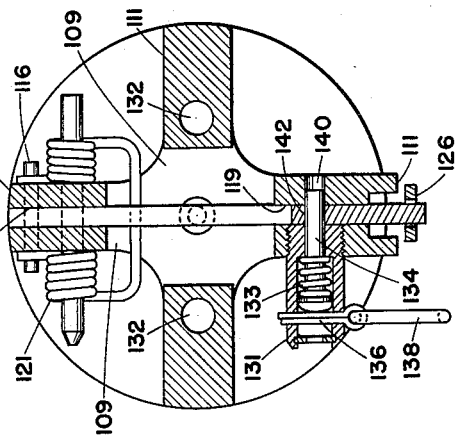
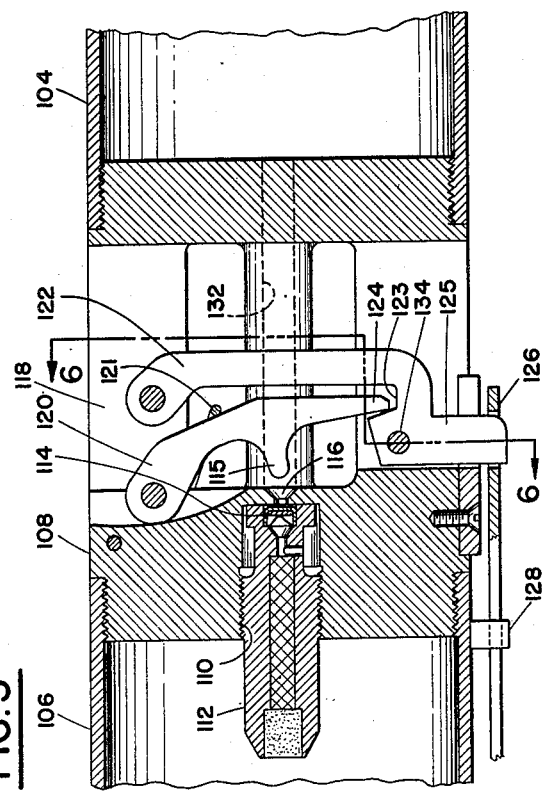
Inventor
FRED M. VARNEY
By M. A. Hayes
Attorney Patented Feb. 27, 1951

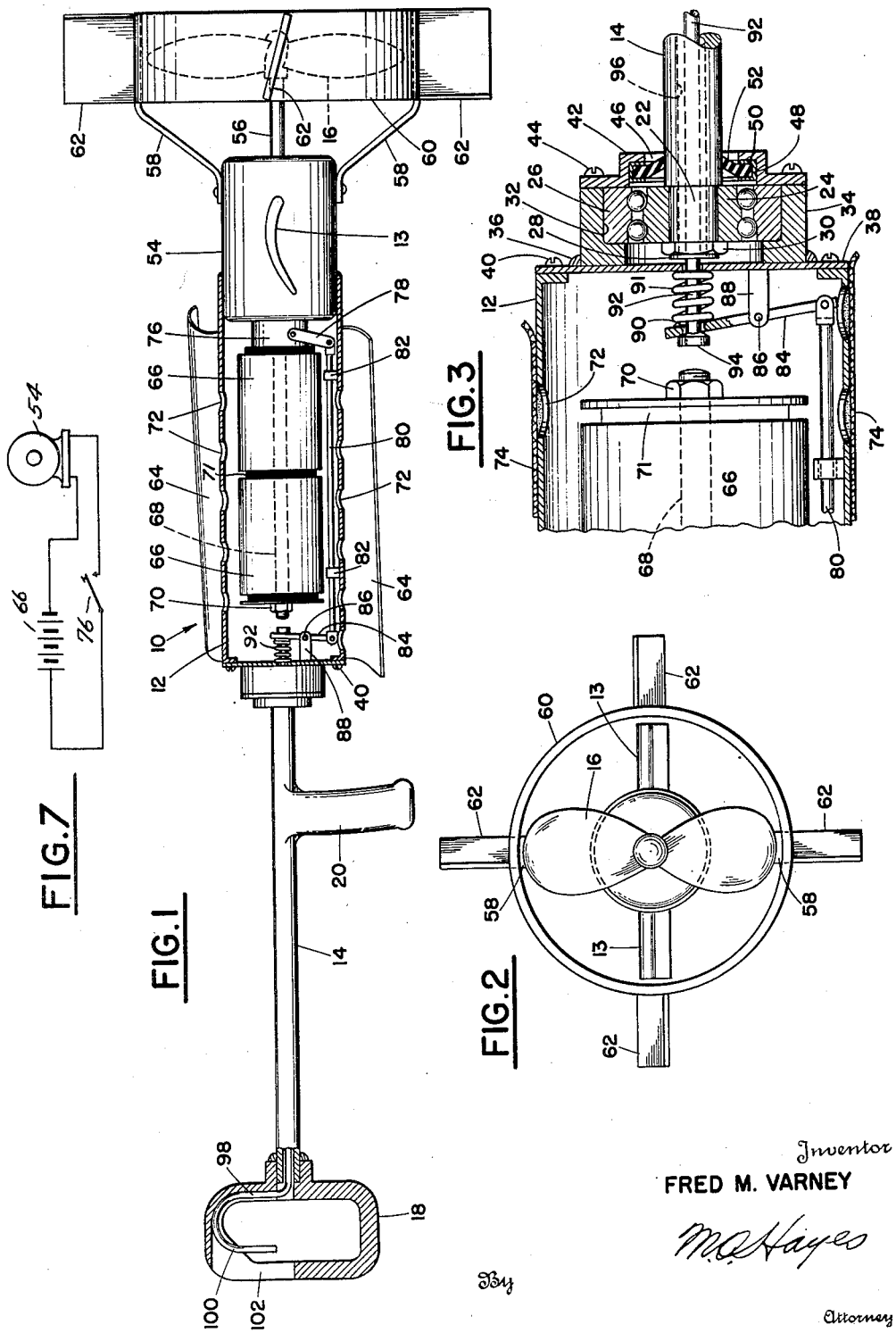

2,543,078

UNITED STATES PATENT OFFICE 2,543,078

EXPENDABLE PULLER

Fred M. Varney, Washington, D. C.

Application May 31, 1946, Serial No. 673,523

6 Claims. (Cl. 9—18)

(Granted under the act of March 3, 1883, as amended April 30, 1928; 370 O. G. 757)

This invention relates to equipment to facilitate military maneuvers and more specifically to a pulling device for assisting in translational movement of personnel and material.

In landing operations, military personnel is subjected to undue peril and hazard from shore installations and machine gun emplacements due to the impossibility of facile evasive movement when partly submerged and encumbered by heavy equipment. Such personnel is also subject to the hazards of an unseen bottom, cross currents, undertow and wind and under the load of heavy equipment frequently is overcome by falling into holes and being submerged beyond its depth.

It is, therefore, an object of this invention to provide means which will assist military personnel in movement through the water by forcefully propelling it in the direction desired for a sufficient length of time to bring it into shallow water regardless of the initial depth of the water at the time of debarkation, the current, wind and other obstacles which impede its progress.

As illustrated herein, the aforesaid device comprises a drawbar, a propeller and means for motivating the propeller attached to the drawbar, means for counteracting the rotational torque of the propeller to prevent rotation of the drawbar during translation thereof and means on the drawbar to which personnel may cling or equipment may be secured. The means for rotating the propeller is a motor or engine enclosed in a housing between the drawbar and the propeller. In one form of the invention batteries are mounted in the housing for driving the motor and a switch is interposed between the batteries and the motor which is operable from the free end of the drawbar. Preferably the batteries are sea batteries operated by the presence of sea water and for this reason apertures are formed in the housing so that when the device is submerged water may gain access to the sea batteries. To preserve the batteries from moisture prior to use, the apertures are covered by patches of cloth or other waterproof material which may readily be stripped off to expose the apertures. In another form of the invention a turbine is employed and a fuel is disposed in the housing which when ignited will drive the turbine. The fuel employed herein is a solid which may be ignited by detonation to burn and generate sufficient gases to drive the turbine. To this end a trigger mechanism is included operable from the drawbar end of the device to set off an igniting cartridge. In both forms of the invention a shroud houses the propeller to prevent damage thereto and reaction blades are formed thereon to assist the means on the housing in counteracting the rotational torque of the propeller.

The invention will now be described in detail with reference to the accompanying drawings in which:

Figure 1 is a side view of the invention partly in section;

Figure 2 is an end view as seen from the right end of Figure 1;

Figure 3 is a vertical section of a fragmentary portion of the device showing the coupling between the housing and drawbar in detail and showing the tear strips covering the apertures;

Figure 4 is a side view of a modified form of the device in which a turbine is employed in lieu of an electric motor;

Figure 5 is a vertical section of a fragmentary portion of the device showing the details of the igniting means and Figure 6 is a cross-section of the device on a line 6—6 of Figure 5.

Figure 7 shows a diagram of the wiring circuit of the motor, switch and batteries.

Referring to Figure 1, the device is indicated generally by the reference character 10 and comprises a cylindrical open-ended housing 12, fins 13, a drawbar 14 and a propeller 16. The drawbar 14 is provided at its free end with a handle 18 and intermediate its ends with a handle or grip 20 so that the device may be held by one or both hands when in use. The fins 13 assist in maintaining the device in a given plane during forward movement. The drawbar 14 is rotatably secured to the end of the housing as follows. The inner or attached end of the drawbar is reduced at 22 (Figure 3) to pass through the inner race 24 of a ball bearing assembly 26. The terminal end of the drawbar 14 is further reduced at 28 and is threaded to receive a nut 30, the latter being adapted to bear against the rear side of the inner race to hold the drawbar in place. The ball bearing assembly 26 is seated in a recess 32 formed in a sleeve 34, the latter being welded or otherwise secured at 36 to an end plate 38 fastened to one end of the housing by screws 40. The ball bearing assembly 26 is retained in the sleeve 34 by a cap plate 42 secured thereto by screws 44. The cap plate 42 has an aperture 46 therein through which the drawbar passes and a substantially water-tight relation is maintained where the drawbar enters the cap plate by forming a recess 50 in the cap plate and disposing therein a channel-shaped ring 48 into which there is set a rubber or other gasket 52 adapted to engage the drawbar.

The propeller 16 in one form of the invention is driven by an electric motor 54, the latter being welded into the opposite end of the housing 12 or otherwise secured as illustrated in Figure 1. The propeller 16 is fastened to the free end of a shaft 56 extending from the motor. Brackets 58 are fastened to the motor housing and extend outwardly and forwardly of the motor to support a shroud 60 which surrounds and protects the propeller 16. A plurality of radially projecting blades 62 are secured to the outer surface of the shroud to provide means for counteracting the rotational torque of the propeller. Additional counteracting means is also provided by a plurality of blades 64 secured to the outer surface of the housing 12 and extending longitudinally thereof.

The motor 54 is driven by batteries 66, a pair of which are shown in Figure 1 as mounted in tandem on a bolt 68 which is threaded at one end to the motor housing. A nut 70 threaded on to the opposite end of the bolt retains the batteries in place and rubber spacer rings or gaskets 71 may be employed to insulate the same from the bolt and each other. Preferably the batteries 66 are sea batteries and are operated upon submergence of the device by the presence of sea water. To this end openings 72 are formed in the housing to permit access of sea water. While the device is not in use, however, to prevent deterioration of the batteries, the housing is maintained substantially air and water tight by sealing means 74 which may be in the nature of a tear strip such as adhesive tape secured over the openings 72 as illustrated in Figure 3 which may be stripped off prior to use.

Between the batteries and motor there is interposed a switch mechanism 76, the details of which are diagrammatically represented in Fig. 7. Switch operating means is provided for operating the switch from a convenient point, preferably one of the handles. This means comprises a lever 78 pivotally attached to the switch 76. A rod 80 is attached at one end to the lever 78 and passes through a pair of spaced brackets 82 secured to the inside of the housing and at its opposite end to a lever 84. The lever 84 is pivotally mounted at 86 on the inner end of a post 88 extending inwardly from the end wall 38. As seen by reference to Figure 3, the lever 84 is provided with an aperture 90 so that it may embrace a rod 92 having a head 94 which prevents withdrawal of the rod 92 from the aperture 90. Normally the rod 92, and hence the switch 76, is held in an inoperable position by a spring 91 interposed between the end of the lever 84 and the inside of the end plate 38. The rod 92 passes through the end plate 38 and through a longitudinal passage 96 formed in the drawbar and rearwardly to the handle 18. At this point the rod 92 is bent laterally at 98 so that it follows the contours of the handle and then is doubled back upon itself at 100 to form a trigger which occupies a slot 102 formed in the handle. The trigger portion 100 is so disposed that it may conveniently be grasped by one holding the handle and actuated by squeezing to operate the switch 76.

In another form of the invention, a turbine 104 is employed rather than an electric motor 54. In this form of the invention the housing 10′ comprises the turbine housing 104 and a fuel cylinder 106, these elements being threadably secured at their adjacent ends to the opposite ends of a block 108, which is provided with corresponding threaded portions. The drawbar 14 is fastened to the fuel cylinder by a rotatable joint in the same manner as it is fastened to the housing 12 in Figure 1 and hence will not be described again. The propeller 16, shroud 60 and reaction blades 62 are likewise secured to the housing of the turbine in the same manner that they were attached to the motor 54 in Figure 1 and, therefore, will not be described again.

The block 108, to the opposite ends of which the turbine 104 and the fuel cylinder 106 are attached, has radial slots 107 formed between its ends which extend into a central passage 109 lengthwise of the block so that there are radial walls 111. At the fuel cylinder end of the block a central threaded passage 110 is formed which extends through the end wall into the passage 109. The passage 110 is adapted to receive a threaded plug 112 which constitutes a delay igniter cartridge, the inner end of which projects into a fuel of any desired type packed into the interior of the fuel cylinder. The cartridge 112 includes a cap 114 which is adjacent to that end of the passage 110 which opens into the passage 109. A firing pin 115 is provided for striking the aforesaid cap. The firing pin 115 is carried by a lever 120 pivotally mounted in a slot 118 formed in one of the walls 111. This lever 120 is urged by a spring 121 mounted in the opposite ends of a pin 116 extending through the wall to drive the firing pin 115 into the cap 114. The lever 120 is restrained from such movement by a lever 122 likewise pivoted in the slot 118. The lever 122 has a recess 123 adapted to receive the terminal end 124 of the lever 120. The free ends of the levers 120 and 122 extend into a slot 119 formed in the wall 111 and the lever 122 has a depending extension 125 which projects through the slot 119 and is engaged by a bar 126 which is slidably mounted in brackets 128 fixed to the fuel cylinder. The bar 126 extends rearwardly to a point adjacent to the grip 20 and has a nob 130 thereon which may be conveniently grasped. The gases generated by ignition of the fuel in the fuel chamber pass through the pair of passages 132 extended through a block 108 from the fuel cylinder to the turbine cylinder.

To prevent accidental operation of the firing mechanism, a safety pin 134 is mounted in a plug 131 threaded into the wall 111 so that the pin extends through an aperture 142 in the lever 122 and a passage 140 formed in the wall. This pin is yieldably held against a spring 133 by a cotter 136 which engages its head, the cotter being passed through the walls of the plug 131 and being removable by a ring 138 attached thereto.

In using either of the aforesaid devices it is only necessary upon debarkation to place the device in the water and to grasp the handles 18 and 20. In a matter of a few seconds after the tear strips 74 have been removed from that form of the device described in Figures 1, 2 and 3, the batteries will generate sufficient energy to operate the motor 54. By pulling on the trigger 100 which can be done simply by squeezing the handle, the switch 76 will be actuated to connect the batteries to the motor 54 and the propeller will immediately begin to rotate and assist in pulling the person or material secured to the handle 18 in whatever direction is desired. In the case of the device shown in Figures 4, 5 and 6, the starting of the device is initiated by pushing on the knob 130 which actuates the firing mechanism to start the fuel in the cylinder 106 burning. As soon as the gas in the cylinder 106 begins to generate, it will pass through the tubes 132 and drive the turbine 104 which in turn will rotate the propeller 16. As contemplated, it is preferred that these devices be made up of an inexpensive material which is expendable so that the devices may be discarded when the operator or the material reaches the shore. It is, however, within the scope of the invention to construct either or both of the devices so that they may be reused. For example, in the form shown in Figure 1, the batteries may be replaced, and in the form shown in Figure 4, the cylinder 106 may be renewed and repacked with fuel.

The invention described herein may be manufactured and used by or for the Government of the United States of America for governmental purposes without the payment of any royalties thereon or therefor.

I claim:

1. A pulling device comprising a housing, a drawbar secured to one end thereof, a propeller mounted at the opposite end, means in the housing for rotating the propeller to move the housing and hence the drawbar in translation, means on said housing for counteracting the rotational torque of the propeller to prevent rotation of the drawbar during translation thereof, and a pair of handles attached to said drawbar for supporting said device in a substantially horizontal position away from the body of an operator and in a desired direction.

2. A pulling device comprising a housing having perforations therein, a drawbar secured to one end thereof, a propeller mounted at the opposite end, an electric motor and sea batteries in the housing, tear strips secured over said perforations to maintain the housing air and moisture tight while not submerged, means on said housing for counteracting the rotational torque of the propeller to prevent rotation of the drawbar during translation thereof, a handle attached at the end of the drawbar, and a second handle attached to the drawbar near said housing whereby said device may be supported substantially horizontally and away from the body of an operator in a desired direction.

3. A pulling device comprising a housing, a drawbar secured to one end thereof, a propeller mounted at the opposite end, a motor and batteries in the housing for rotating the propeller to move the drawbar in translation, fins on the housing to counteract the rotational torque produced by the propeller, a handle attached at the end of the drawbar, a switch for starting and stopping said motor secured to said handle, and a second handle attached to the drawbar near said housing whereby said device may be supported substantially horizontally and away from the body of an operator in a desired direction.

4. A pulling device comprising a housing, a drawbar secured to one end thereof having a passage extending longitudinally therethrough, a propeller mounted at the opposite end, a motor and batteries in the housing for rotating the propeller to move the drawbar in translation, fins on the housing to counteract the rotational torque, a switch between the batteries and the motor, switch operating linkage extending from the switch through said passage to the free end of the drawbar, a pair of handles secured to said drawbar and one of said handles having a trigger attached to said switch linkage whereby said device may be held in two hands in a substantially horizontal position away from the body of an operator and starting and stopping of said motor may be controlled.

5. A pulling device comprising a housing, a drawbar secured to an end thereof, a propeller mounted at the opposite end, a turbine in the housing to which the propeller is attached, a propellant in the housing for motivating the turbine, means operable from the free end of the drawbar to cause the propellant to drive the turbine and hence the propeller, means associated with the device for counteracting the rotational torque of the propeller, and a pair of handles attached to said drawbar for supporting said device in a substantially horizontal position away from the body of an operator and in a desired direction.

6. A pulling device comprising a drawbar, a motor attached to the drawbar, a propeller connected to and driven by said motor, means attached to said motor to prevent rotation of the drawbar during the translation thereof and a pair of handles attached to said drawbar for supporting said device in a substantially horizontal position away from the body of an operator and in a desired direction.

FRED M. VARNEY.

REFERENCES CITED

The following references are of record in the file of this patent:

UNITED STATES PATENTS

| Number | Name | Date |
| --- | --- | --- |
| 827,202 | Bachman | July 31, 1906 |
| 965,912 | Krohn | Aug. 2, 1910 |
| 1,226,768 | Haran | May 22, 1917 |
| 1,433,563 | Osterhout | Oct. 31, 1922 |
| 1,474,952 | Allen et al. | Nov. 20, 1923 |
| 1,512,391 | Abraham | Oct. 21, 1924 |
| 1,579,529 | Haschke | Apr. 6, 1926 |
| 1,586,595 | Barringer | June 1, 1926 |
| 1,691,188 | Hall | Nov. 13, 1928 |
| 2,045,645 | Hansen | June 30, 1936 |
| 2,109,813 | Winckler | Mar. 1, 1938 |

FOREIGN PATENTS

| Number | Country | Date |
| --- | --- | --- |
| 4,459 | Great Britain | of 1901 |